United States Patent
Hein et al.

(10) Patent No.: US 11,720,069 B2
(45) Date of Patent: Aug. 8, 2023

(54) METHOD FOR THE COMPUTER-AIDED CONTROL OF A TECHNICAL SYSTEM, MORE PARTICULARLY A POWER GENERATION INSTALLATION

(71) Applicant: Siemens Aktiengesellschaft, Munich (DE)

(72) Inventors: Daniel Hein, Munich (DE); Alexander Hentschel, Vancouver (CA); Steffen Udluft, Eichenau (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 280 days.

(21) Appl. No.: 16/766,564

(22) PCT Filed: Oct. 11, 2018

(86) PCT No.: PCT/EP2018/077663
§ 371 (c)(1),
(2) Date: May 22, 2020

(87) PCT Pub. No.: WO2019/101422
PCT Pub. Date: May 31, 2019

(65) Prior Publication Data
US 2020/0348631 A1    Nov. 5, 2020

(30) Foreign Application Priority Data

Nov. 24, 2017   (EP) .................................. 17203614

(51) Int. Cl.
*G05B 13/04*     (2006.01)
*G05B 13/02*     (2006.01)
*H02J 3/38*      (2006.01)

(52) U.S. Cl.
CPC ....... *G05B 13/042* (2013.01); *G05B 13/0265* (2013.01); *H02J 3/38* (2013.01); *H02J 2203/20* (2020.01)

(58) Field of Classification Search
CPC ............... G05B 13/042; G05B 13/0265; H02J 2203/20
(Continued)

(56) References Cited

U.S. PATENT DOCUMENTS

2005/0192680 A1*  9/2005  Cascia ................. G05B 13/027
                                                                700/29
2010/0070098 A1   3/2010  Sterzing et al.
(Continued)

FOREIGN PATENT DOCUMENTS

CN   102023570 A   4/2011
CN   104598654 A   5/2015
(Continued)

OTHER PUBLICATIONS

AMIFS Adaptive Feature Selection by Using Mutual Information, By: Michel Tesmer (Year: 2004).*
(Continued)

*Primary Examiner* — Jigneshkumar C Patel
(74) *Attorney, Agent, or Firm* — Schmeiser, Olsen & Watts LLP (57) ABSTRACT

Provided is a method for the computer-assisted control of a technical system, in particular in a plant for generating energy, to achieve a predetermined technical behavior of the technical system, wherein an operating data set for controlling the system is provided. A system model for describing the mode of operation of the technical system is provided, wherein on the basis of the operating data set and on the basis of the system model, an optimization data set is determined by an optimization method. Based on the optimization data set, relevant parameters of the technical sys- (Continued)

tem that allow a more advantageous control of the technical system than other parameters of the technical system are selected using a selection method, wherein with the selected relevant parameters, a control method for the technical system is determined, wherein the technical system is controlled with the aid of the control method.

7 Claims, 5 Drawing Sheets

(58) Field of Classification Search
USPC .......................................................... 700/47
See application file for complete search history.

(56) References Cited

U.S. PATENT DOCUMENTS

| | | | |
|---|---|---|---|
| 2011/0059427 A1 | 3/2011 | Hans et al. | |
| 2014/0100703 A1* | 4/2014 | Dull | F03D 17/00 700/289 |
| 2016/0041536 A1* | 2/2016 | Benosman | G05B 13/048 700/31 |
| 2016/0209031 A1* | 7/2016 | Lou | G05B 19/406 |
| 2017/0160706 A1* | 6/2017 | Düll | G06N 3/006 |

FOREIGN PATENT DOCUMENTS

| | | |
|---|---|---|
| CN | 106485594 A | 3/2017 |
| DE | 102016010796 A1 | 3/2017 |
| WO | 2010121695 A1 | 10/2010 |
| WO | 2015043806 A1 | 4/2015 |

OTHER PUBLICATIONS

Guyon, Isabelle et al., "An Introduction to Variable and Feature Selection," Journal of Machine Learning Research 3 (2003) 1157-1182; 26 pages.

Battiti, Roberto, "Using Mutual Information for Selecting Features in Supervised Neural Net Learning," IEEE Transaction on Neuronal Networks, vol. 5, Issue 4, pp. 537 to 550, Jul. 1994; 14 pages.

Tesmer, Michel, et al., "AMIFS: Adaptive Feature Selection by Using Mutual Information," 2004 IEEE, 07803-8359-1/04, pp. 303 to 308; 6 pages.

Hein, Daniel, et al., "Reinforcement Learning with Particle Swarm Optimization Policy (PSO-P) in Continuous State and Action Spaces," vol. 7, Issue 3, Jul.-Sep. 2016, International Journal of Swarm Intelligence Research, Site 23 to 42, 20 pages.

International Search Report and Written Opinion of International Searching Authority in related PCT International Application No. PCT/EP2018/077663 dated Feb. 4, 2019. 13 pages.

European Search Report in related European Patent Application No. 17203614.7, dated Jun. 4, 2018. 7 pages.

Vergara et al., "A Review of Feature Selection Methods Based on Mutual Information", Department of Electrical Engineering, Faculty of Physical and Mathematical Sciences, University of Chile, Chile; CONICYT-Chile; http://arxiv.org/abs/1509.07577v1 [cs.LG] Sep. 24, 2015; 24 pgs.

* cited by examiner

METHOD FOR THE COMPUTER-AIDED CONTROL OF A TECHNICAL SYSTEM, MORE PARTICULARLY A POWER GENERATION INSTALLATION

CROSS-REFERENCE TO RELATED APPLICATIONS

This application is a national stage entry of PCT Application No. PCT/EP2018/077663, having a filing date of Oct. 11, 2018, which claims priority to European Patent Application No. 17203614.7, having a filing date of Nov. 24, 2017, the entire contents of which are hereby incorporated by reference.

FIELD OF TECHNOLOGY

The following relates to a method for the computer-aided control of a technical system, more particularly an installation for power generation.

BACKGROUND

Various methods for controlling power generating installations are known in the prior art. For efficient control of an installation for power generation, in particular, it is advantageous to ascertain an optimum control method and to use the optimum control method.

SUMMARY

An aspect relates to an improved method for the computer-aided control of a technical system.

An advantage of the method described is that improved control of the technical system is achieved. This is achieved by virtue of an operating data record and a system model of the technical system being taken as a basis for using a more particularly gradient-free optimization method to ascertain an optimization data record. The optimization method is used to use an open method in order to ascertain an optimization data record. The optimization data record is taken as a basis for using a selection method to select relevant parameters of the technical system that allow more advantageous control of the technical system than other parameters of the technical system.

The selected relevant parameters are used to ascertain a control method for the technical system. The ascertained control method is used to control the technical system. The term control is understood to mean both control and automatic control. The proposed method allows an optimized control method for the technical system to be ascertained with less computation complexity.

In one embodiment, the selection method used is an adaptive mutual information feature selection (AMIFS) method. This method can be used to select more suitable relevant parameters for controlling the technical system than with other selection methods. The more accurate selection of the relevant parameters therefore achieves a further improvement in the control method.

In a further embodiment, the selected relevant parameters are taken as a basis for using a model-based reinforcement learning method to ascertain the control method. This allows an optimized control method for the technical system to be ascertained quickly and precisely.

In a further embodiment, a model-free reinforcement learning method is used to ascertain the control method on the basis of the selected relevant parameters. The use of the model-free reinforcement learning method can also be used to ascertain a control method optimized for the technical system.

In one embodiment, the optimization method used is a swarm optimization method. A particle swarm optimization method can be used, which is well-suited to the method described.

BRIEF DESCRIPTION

Some of the embodiments will be described in detail, with reference to the following figures, wherein like designations denote like members, wherein.

DETAILED DESCRIPTION

Figure 1:
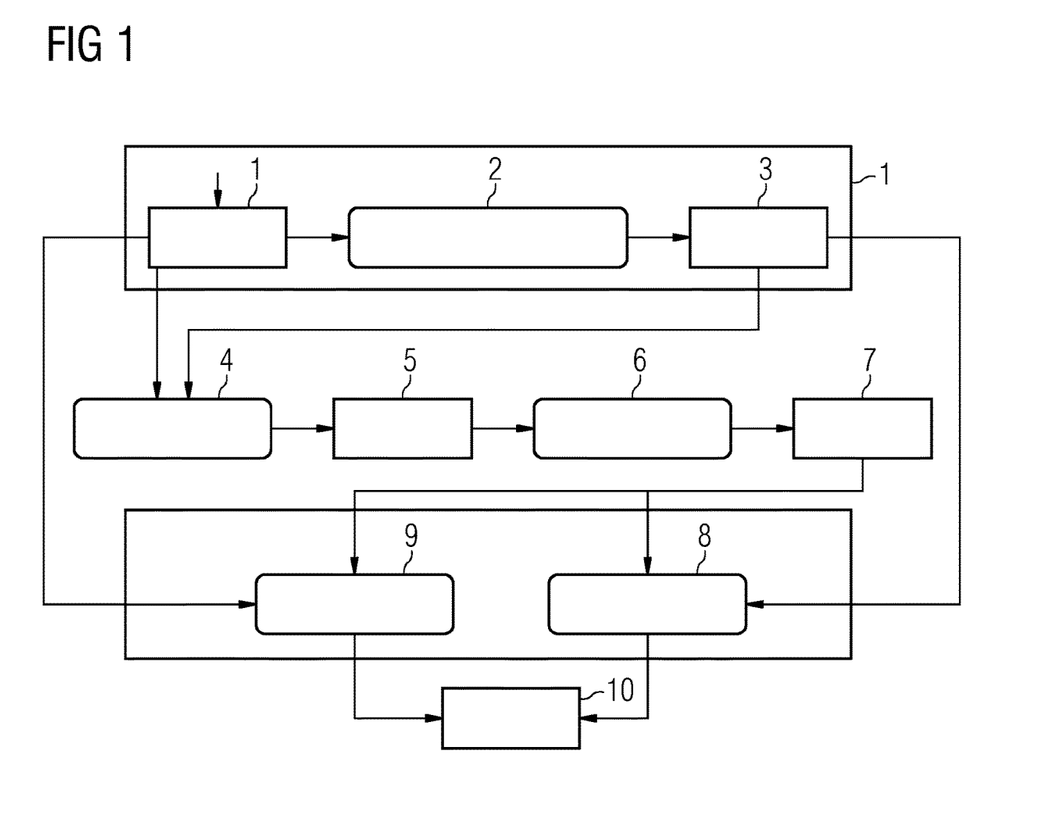
FIG. 1 depicts a schematic depiction of various methods for ascertaining the control method.

FIG. 1 shows a schematic depiction of various methods for producing a control method for a technical system. At a first program point 1, a prescribed operating data record for controlling the technical system is provided. The operating data record is ascertained experimentally, for example, or filled with prescribed values. In a simple embodiment, random values for the control are used during the creation of the operating data record at the first program point 1. The operating data record is conveyed from the first program point 1 to a fourth program point 4 directly.

At a second program point 2, the operating data record is taken as a basis for using regression training using a machine learning method to ascertain a system model 3 for the technical system.

This can involve for example a neural network, more particularly a recurrent neural network, being used to ascertain the system model 3 for the technical system, for example an installation for power generation. The installation for power generation can be in the form of a gas turbine or in the form of a wind turbine, for example. The ascertained system model 3 is conveyed to the fourth program point 4.

At the fourth program point 4, the operating data record and the system model 3 are used to use a gradient-free optimization method, more particularly to use a swarm optimization method, to ascertain a control data record 5. The control data record 5 comprises an assigned optimum value for at least one control parameter, more particularly assigned values for multiple control parameters, for at least a state of the system. The control data record comprises the assigned optimum values of control parameters for a multiplicity of states of the system. The control data record therefore describes values for control parameters for controlling the technical system more particularly for different states of the technical system, in order to achieve a desired optimum response from the technical system.

The control data record 5 is used at a fifth program point 6 in order to ascertain relevant control parameters by using a selection method. The selection method at the fifth program point 6 is designed to select a limited number of relevant technical parameters of the technical system that allow better control of the technical system than other technical parameters of the technical system.

The relevant parameters can be selected by using various methods. By way of example, methods based on mutual information with reference to the control parameters can be used. By way of example, an AMIFS method can be used to select the stipulated number of more relevant parameters from the available parameters of the technical system. The AMIFS (adaptive feature selection by using mutual information) method is described by Michel Tesmer and Pablo A. Estévez, for example, in 2004 IEEE, 0-7803-8359-1/04, page 303 to page 308. Moreover, other selection methods can also be used for selecting the prescribed number of more relevant parameters, as described by Isabelle Guyon et al., for example, in "An Introduction to Variable and Feature Selection", Journal of Machine Learning Research 3(2003) 1157-1182. Furthermore, an MIFS or MIFS-U method can also be used for selecting the prescribed number of more relevant parameters. However, experiments have shown that the AMIFS method is particularly suitable for selecting the more relevant parameters for technical systems such as installations for power generation. The methods MIFS and MIFS-U are described by R. Battiti, for example, in "Using Mutual Information for Selecting Features in Supervised Neural Net Learning", IEEE Transaction on Neural Networks, volume 5, issue 4, pages 537 to 550, July 1994.

At the fifth program point 6, a number of relevant parameters 7 are selected from the set of available parameters by using one of the methods described above. The ascertained relevant parameters 7 are used at a sixth program point 8 to use a model-based learning method to ascertain an optimized control method with improved values for the technical system. This involves e.g. the system model 3 ascertained at the second program point 2 being used as model for the model-based learning method.

The control method can be created in the form of functions, tables, characteristic curves, etc. By way of example, the control method can be in the form of a data record, wherein the data record has a respective value for a control parameter for multiple states of the system. Moreover, the control method can be in the form of a data record, wherein the data record has respective values for multiple control parameters of the technical system for a respective state of the technical system.

In a further embodiment, the relevant parameters 7 can be used at a seventh program point 9 and by taking into consideration the operating data record provided at the first program point 1 to use a model-free reinforcement learning method, more particularly to use a reinforcement machine learning method, to ascertain a further optimized control method for the technical system.

The further control method can be created in the form of functions, tables, characteristic curves, etc. By way of example, the further control method can be in the form of a data record, wherein the data record has a respective value for a control parameter for multiple states of the system. Moreover, the further control method can be in the form of a data record, wherein the data record has respective values for multiple control parameters of the technical system for a respective state of the technical system.

At a subsequent eighth program point 10, either the control method ascertained by the sixth program point 8 or the further control method ascertained by the seventh program point 9 is used by a control unit to control the technical system.

Figure 2:
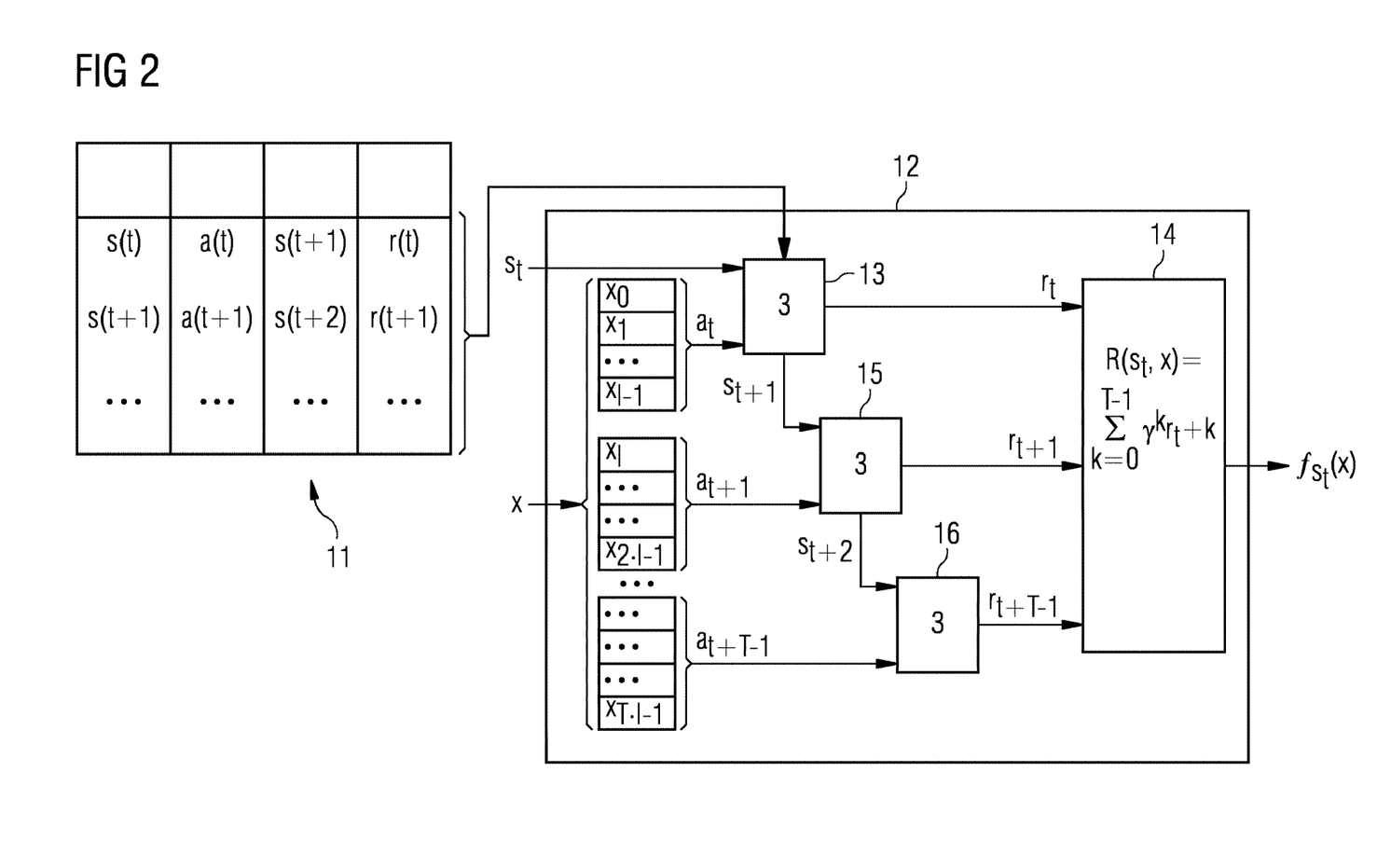
FIG. 2 depicts a schematic depiction of the ascertainment of a system model on the basis of an operating data record.

FIG. 2 shows a schematic depiction of a possible method that is used to ascertain a system model 3 for the technical system at the second program point 2 on the basis of the operating data made available by the first program point 1.

The description of the technical system by using a state space S, an action space A and a stochastic transfer function P is consistent with the known Markov decision process. It is assumed that the technical system can be described by using such a process. For this process, there exists a reward function c: S×A×S→R, where R is the space of the rewards in the form of real numbers $r_t$ that the system receives for selecting an action $a_t$ in the state $s_t$, and where the system is transferred to the state $s_{t+1}$.

The method described is applicable to any type of technical system whose dynamic response can be described by a state space S and an action space A by using a stochastic transfer function $P(s_t, a_t, s_{t+1})$. Here, $s_t$, $s_{t+1}$ are states of the technical system at the times t and t+1, respectively. Moreover, $a_t$ denotes a control action that influences the technical system at the time t. Moreover, $a_{t+1}$ denotes a control action that influences the technical system at the time t+1.

Each state of the technical system is characterized by a plurality of state variables or environment variables. The environment variables are measurable state quantities of the technical system, for example gas pressure, gas temperature, a combustion chamber acceleration and the like for a gas turbine. Analogously, the state quantities are for example a wind speed, an rpm of the rotor blade, a rotation speed of the rotor blade, an acceleration of the rotor blade and the like for a wind installation.

The actions $a_t$ are control parameters, i.e. manipulated quantities of the technical system at the time t, which in turn influence later states of the technical system. A state $s_t$ can have multiple state variables or be denoted by multiple state variables. Analogously to the state $s_t$, an action $a_t$ can also comprise a plurality of action variables, and an action can therefore be characterized by the alteration of multiple manipulated quantities. An example of a manipulated quantity alterable on a technical system is the adjustment of valves in a gas turbine. In the case of a wind turbine, it can be the angular position of the rotor blades or the orientation of the rotor per se, for example. However, it is also possible for any other control parameters of the technical system, more particularly the wind turbine or the gas turbine, to be used as an action variable. Often, the technical systems are even designed such that the state space and the action space overlap, that is to say that a manipulated quantity in the technical system also characterizes the state of the technical system.

The aim is now to determine an optimum rule for all actions in a prescribed future period, which rule maximizes the expected cumulative reward function or the average reward function c for each state of the prescribed period. The maximizing of the reward function c is consistent with a possible embodiment of an action selection rule. The reward function is more particularly stipulated such that it reflects the desired properties of the technical system. In the simplest case, the reward function could have a maximum value for a desired state of the technical system or for a desired sequence of states of the technical system in the stipulated future period, for example. It is assumed below that the technical system is described by a Markov decision process by using discrete time steps, the state spaces S and A being continuous.

FIG. 2 shows a schematic depiction of a method for ascertaining a system model for a technical system. In the case of the method shown in FIG. 2, an operating data record made available in accordance with the first program point 1 is depicted in the form of a table 11. The operating data record was e.g. measured or captured on the technical system for a prescribed period. In this instance, s(t) denotes the states of the technical system, a(t) denotes the action stipulated for the state s(t) and r(t) denotes the reward achieved for the action a(t) in the case of the state s(t). The state arising from the state s(t) after the action a(t) is denoted by s(t+1).

The present operating data record is taken as a basis for adapting the system model 3, e.g. by means of monitored machine learning, until the measured states and the states calculated by using the system model 3 are as concordant as possible. Each action $a_t$ can have multiple action variables $x_0, x_1, \ldots, x_{I-1}$. The action variables are therefore at least one or more manipulated quantities. The action $a_t$ is then applied to the state $s_t$ in the processing block 12 in a first processing step 13. This involves a system model 3 being used. The first processing step 13 results in the then arising next state $s_{t+1}$ being ascertained. Moreover, a reward $r_t$ is ascertained for the transition between the state $s_t$ and the state $s_{t+1}$. The reward $r_t$ is forwarded to a summation block 14.

Moreover, a second processing step 15 results in the action $a_{t+1}$ being applied to the state $s_{t+1}$. This again involves the system model 3 being used. In the second processing step 15, a state $s_{t+2}$ arising on the basis of the state $s_{t+1}$ and the action $a_{t+1}$ is ascertained. Moreover, a reward $r_{t+1}$ is ascertained for the second processing step 15. The reward $r_{t+1}$ is supplied to the summation block 14.

For a stipulated number of states $s_{t+(T-1)}$, the applicable actions $a_{t+2}$ to $a_{t+T-1}$ are executed by using applicable processing steps, and the associated rewards $r_{t+2}$ to $r_{t+T-1}$ are ascertained and forwarded to the summation block 14. This involves the respective system model 3 being used.

In summation block 14, the rewards $r_t, r_{t+1}, \ldots, r_{t+T-1}$ are summed, a weighting factor $\gamma^k$ being able to be used. The weighting factor $\gamma^k$ is equal to 1 for k=0 and decreases with the magnitude of k. $\gamma$ can assume values between 0 and 1. The effect achieved by this is that states further in the future, which are more uncertain, have less of an influence on the sum of the rewards. The sum of the rewards, which is ascertained in the summation block 14, can be used to optimize the model, that is to say to optimize the actions $a_{t+k}$ for the respective states $s_{t+k}$. To this end, the individual actions $a_t$ can be altered in iterative steps. This optimizes a trajectory.

At the fourth program point 4 of FIG. 1, the operating data record from the first program point 1 and the system model ascertained by the second program point 2 on the basis of the operating data record are processed. At the fourth program point 4, the operating data record and the system model are taken as a basis for using a more particularly gradient-free optimization method, more particularly for using a swarm optimization method, to ascertain an improved control data record 5. Depending on the chosen embodiment, a particle swarm optimization method can be used.

A method for ascertaining a second control data record on the basis of the first control data record by using a swarm optimization method is known e.g. from WO 2015/043806 A1. Furthermore, a swarm optimization method is known from "Reinforcement Learning with Particle Swarm Optimization Policy (PSO-P) in Continuous State and Action Spaces" by Daniel Hein et al., volume 7, issue 3, July-September 2016, International Journal of Swarm Intelligence Research, pages 23 to 42.

Figure 3:
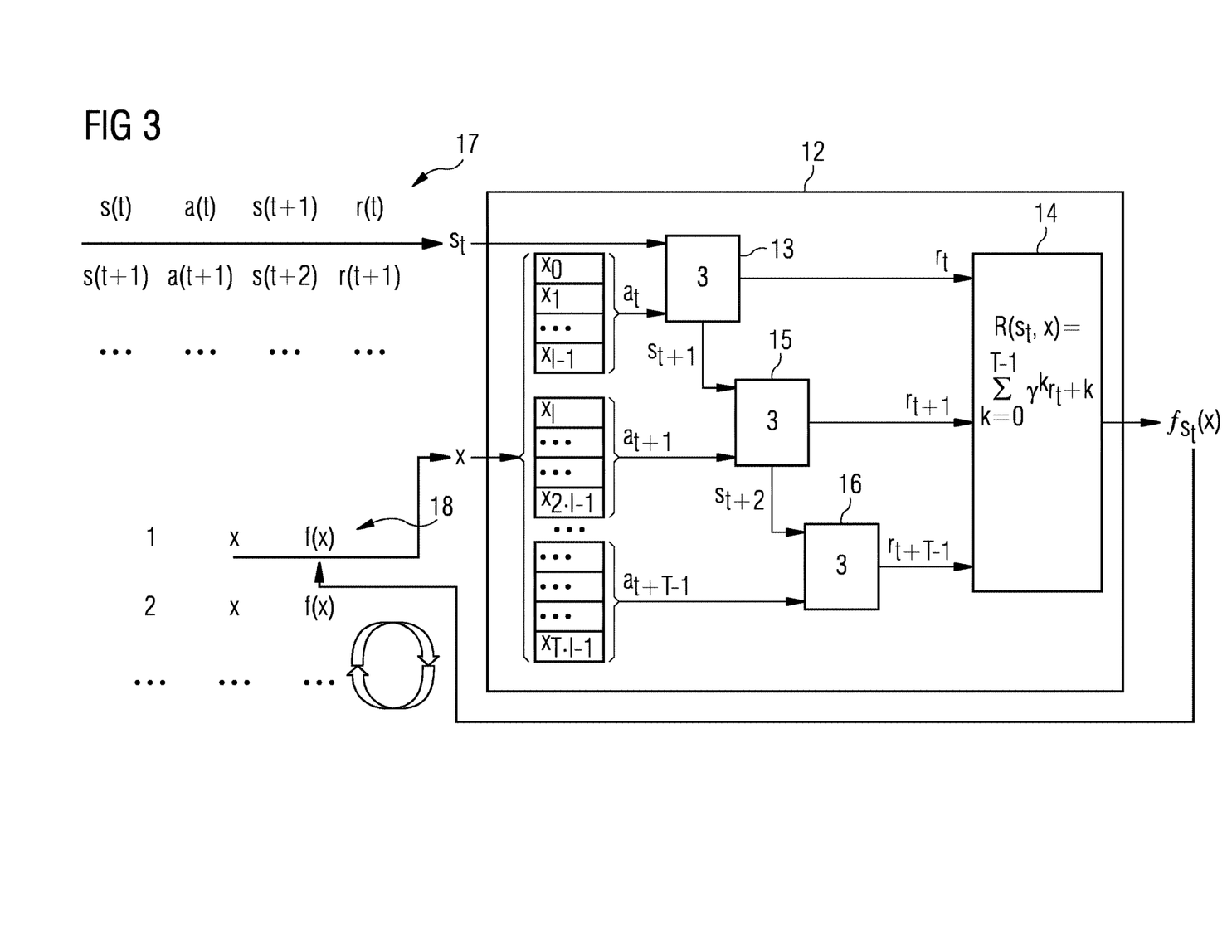
FIG. 3 depicts a schematic depiction of a first method stage for a swarm optimization method.

FIG. 3 shows a schematic depiction of a swarm optimization method. A second table 17 containing an operating data record that e.g. was captured or measured on the technical system is depicted. The states s(t) at the time t, the actions a(t) for the state s(t) at the time t, the ensuing states s(t+1) at the time t+1 and the rewards r(t) are depicted in a column. Depending on the chosen embodiment, the rewards r(t) can also be first ascertained by using this method.

Furthermore, there is provision for a second processing block 12, containing processing steps 13, 15, 16 and containing a summation block 14. Processing steps 13, 15, 16 involve the system model 3 ascertained in FIG. 2 being used in order to calculate resultant states, and rewards resulting therefrom, from a measured state and the possible actions. Additionally, a fitness function $f_{st}(x)$ is ascertained, wherein an action vector x has the actions $a_t$, $a_{t+1}$ to $a_{t+T-1}$.

This method involves the swarm optimization method being used to iteratively alter the vector x for the state variables until a vector x for the state variables is ascertained that has a maximum reward sum for the stipulated number of actions, that is to say a maximum fitness function $f_{st}(x)$. Details pertaining to the described method are described in the article "Reinforcement Learning with Particle Swarm Optimization Policy (PSO-P) in Continuous State and Action Spaces", Daniel Hein et al., International Journal of Swarm Intelligence Research, volume 7, issue 3, July-September 2016, Pages 23 to 42.

By way of example, the action sequences x are accordingly listed in order in a third table 18 with the associated fitness function f(x).

Figure 4:
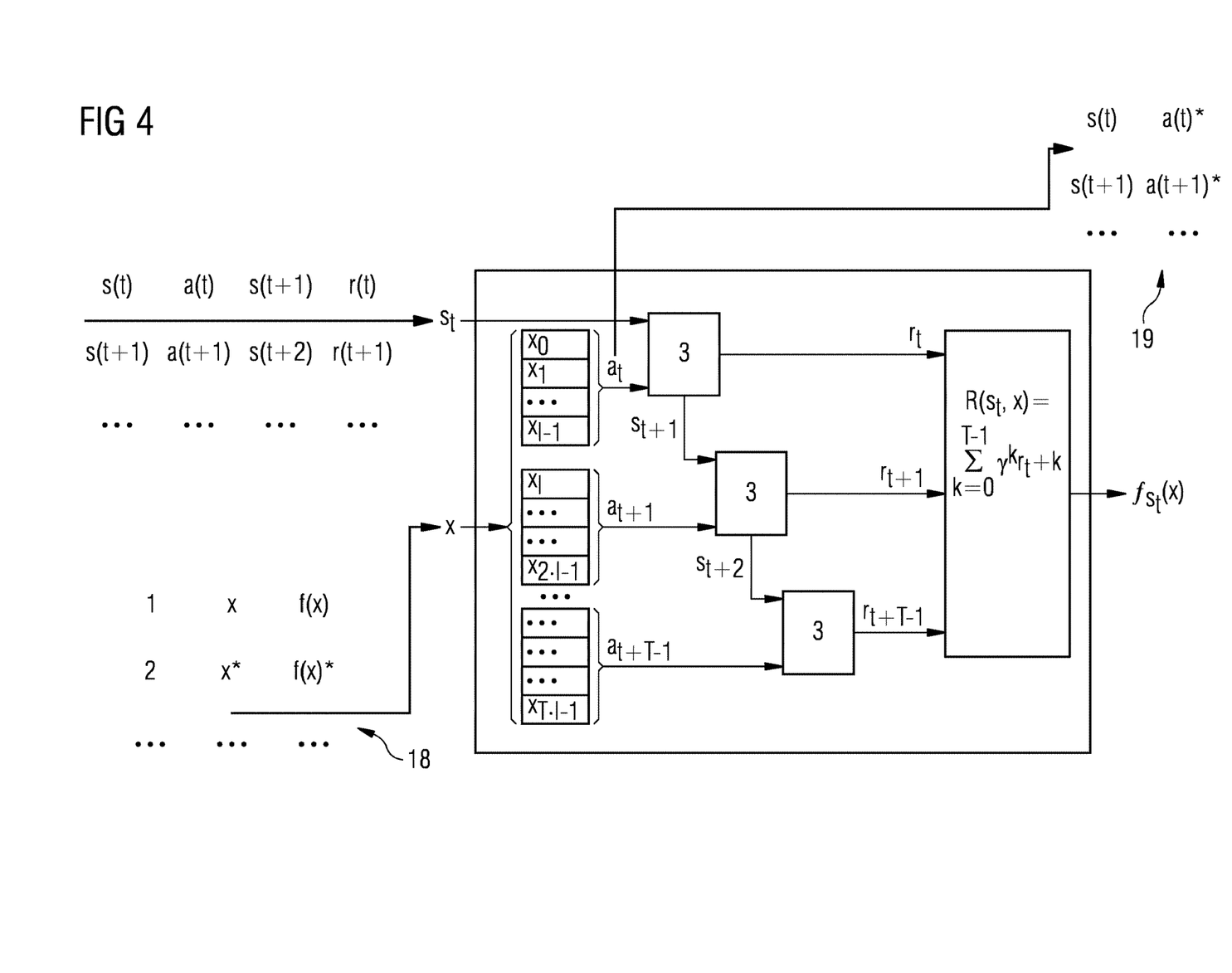
FIG. 4 depicts a schematic depiction of a second method stage for the swarm optimization method.

FIG. 4 shows the method shown in FIG. 3, wherein the ascertainment of the best action sequence x according to the third table 18 is followed by the state s(t) and the associated action a(t) of the best action sequence being entered in a fourth table 19.

Subsequently, stipulation of the action a(t) results in the method shown in FIG. 3 being performed again and this again involving a variation of the action sequence x being performed, with the action a(t) remaining unchanged. The optimum action sequence x obtained on the basis of this variation is used to stipulate the second optimum action a(t+1) and enter it in the fourth table 19. In this way, a fourth table 19 is created in which optimized actions a(t) to a(t+T-1) have been ascertained for the states s(t) to s(t+T-1). The fourth table 19 is subsequently transferred as second control data record 5 to the fifth program point 6.

The fifth program point 6 takes the second control data record 5 as a basis for using a selection method to ascertain a stipulated number of selected parameters that allow better control of the technical system than the stipulated number of other parameters.

The selection method can, as already explained above, involve one of multiple methods being used. By way of example, methods using mutual information of the parameters can be used for selecting the parameters, as described by Jorge R. Vergara, Pablo A. Estévez, for example, in "A Review of Feature Selection Methods Based on Mutual Information". A selection method allowing for adaptive mutual information (AMIFS) is used, as was already described.

Therefore, the result ascertained for the fifth program point 6 is a prescribed number of more relevant, that is to say more important, parameters of the technical system for optimized control.

The more relevant parameters 7 are subsequently processed either by using a model-based machine learning method as per the seventh program point 8 or by using a model-free machine learning method as per the eighth program point 9 in order to ascertain a control method that is used at the ninth program point 10 for controlling the technical system.

By way of example, a reward function ($r_t$, $r_{t+1}$, . . . ) can represent an optimization criterion such as for example lowest possible emission of pollutants in the case of gas turbines or highest possible power generation in the case of wind power installations. Moreover, other optimization criteria can also be taken into consideration when ascertaining the reward function, however.

To calculate the mutual information, the following parameters can be used as classes for a gas turbine, for example: ambient pressure, ambient temperature, temperature of the gas turbine, exhaust gas temperature, valve positions, etc. For a wind power installation, that is to say for a wind turbine, the following parameters can be used as classes, for example: rpm of the rotor, output of the power generation, pitch angle of the rotor blades, orientation of the rotor, time of day, air pressure, etc.

Figure 5:
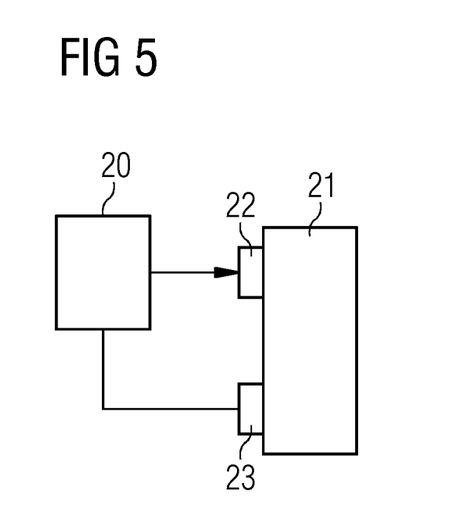
FIG. 5 depicts a schematic design of a system for performing the method.

FIG. 5 shows a schematic depiction of a computing unit 20 connected via control lines to actuators 22 of an installation for power generation 21. Moreover, the computing unit 20 is connected to sensors 23 via sensor lines. The sensors 23 are designed to capture parameters, more particularly operating parameters and environment parameters, of the installation for power generation 21. The computing unit 20 is designed to control or automatically control the installation for power generation by using the ascertained control method in accordance with the ninth program point 10.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-aided control of a power plant for power generation, to achieve a prescribed technical response from the power plant, the method comprising:
   providing an operating data record for controlling the power plant, wherein the operating data record includes a respective value for a control parameter for multiple states of the power plant;
   using the operating data record as a basis for using regression training to ascertain a system model for describing a manner of operation of the power plant;
   determining, using a gradient-free optimization method and the system model and the operating data record, a control data record including at least one optimal value for the control parameter for at least one of the multiple states of the power plant;
   taking the determined control data record as a basis for using a selection method by using a reward function to select relevant parameters of the power plant that allow more advantageous control of the power plant than other parameters of the power plant; and
   using a model-based machine learning method, ascertaining a control method for the power plant by using the selected relevant parameters, wherein the control method is used to control the power plant.

2. The method as claimed in claim 1, wherein the selection method is an adaptive mutual information feature selection method.

3. The method as claimed in claim 1, wherein a model-based reinforcement learning method is used to ascertain the control method on the basis of the selected relevant parameters.

4. The method as claimed in claim 1, wherein the optimization method used is a swarm optimization method.

5. The method as claimed in claim 4, wherein the swarm optimization method used is a particle swarm optimization method.

6. A computer program product, comprising a non-transitory computer readable hardware storage device having computer readable program code stored therein, said program code executable by a processor of a computer system to implement the method, as claimed in claim 1.

7. A power plant system comprising:
   a power plant configured for power generation including actuators and sensors;
   a computing unit connected to the actuators and the sensors, wherein the computing unit is configured to control the power plant to achieve a prescribed technical response from the power plant in accordance with a method comprising:
   providing an operating data record for controlling the power plant, wherein the operating data record includes a respective value for a control parameter for multiple states of the power plant;
   using the operating data record as a basis for using regression training to ascertain a system model for describing a manner of operation of the power plant;
   determining, using an optimization method and the system model and the operating data record, a control data record including at least one optimal value for the control parameter for at least one of the multiple states of the power plant;
   taking the determined control data record as a basis for using a selection method by using a reward function to select relevant parameters of the power plant that allow more advantageous control of the power plant than other parameters of the power plant; and
   using a model-based machine learning method, ascertaining a control method for the power plant by using the selected relevant parameters, wherein the control method is used to control the power plant.

* * * * *